United States Patent [19]
Young et al.

[11] 3,722,278
[45] Mar. 27, 1973

[54] FLOW METER

[75] Inventors: Francis Graham Young, Southampton; Christopher Guy Scott Wilson, Portsmouth, both of England

[73] Assignee: National Research Development Corporation, London, England

[22] Filed: Oct. 21, 1970

[21] Appl. No.: 82,729

[30] Foreign Application Priority Data

Oct. 22, 1969 Great Britain..................51,795/69

[52] U.S. Cl..................................................73/228
[51] Int. Cl..................................................G01f 1/00
[58] Field of Search.........................................73/228

[56] References Cited

UNITED STATES PATENTS 3,330,269  7/1967  Pieper...........................73/228 X
2,707,394  3/1955  Lewis............................73/228

FOREIGN PATENTS OR APPLICATIONS 645,490  11/1950  Great Britain..................73/228

OTHER PUBLICATIONS

C. M. Doolittle et al. Fluid Flow Measuring Device. IBM Bulletin. Vol. 1, No. 5, Feb. 1959. 1 page.

Primary Examiner—Jerry W. Myracle
Attorney—Cushman, Darby & Cushman

[57] ABSTRACT

A flow of liquid to be monitored is passed longitudinally into a cylinder via a nozzle so as to impinge on a leaky piston within the cylinder. The piston is resiliently urged towards the nozzle and takes up a position dependent on the flow rate, this position being sensed by a displacement transducer.

2 Claims, 3 Drawing Figures

PATENTED MAR 27 1973    3,722,278

FLOW METER

This invention relates to flow meters and has as one object the provision of a relatively simple and robust form of flow meter suitable for the accurate monitoring of both steady and rapidly changing flows of liquid.

According to the invention a flow meter comprises a cylindrical chamber having a nozzle through which a flow of liquid may be introduced longitudinally into the chamber and an outlet for egress of the liquid from the chamber, a leaky piston arranged to slide longitudinally within the chamber and having a surface disposed close to and facing the nozzle, resilient means arranged to urge the piston towards the nozzle, and a displacement transducer responsive to the displacement of said surface from the nozzle.

Figure 2A:
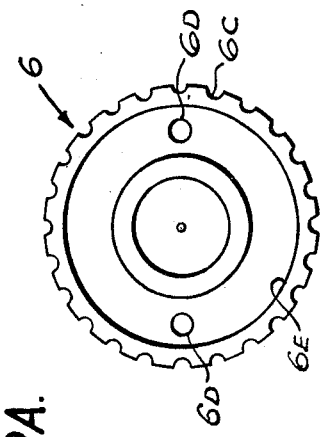
Figure 2B:
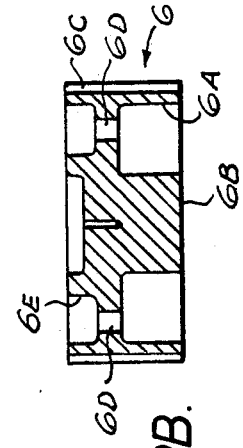
Figure 1:
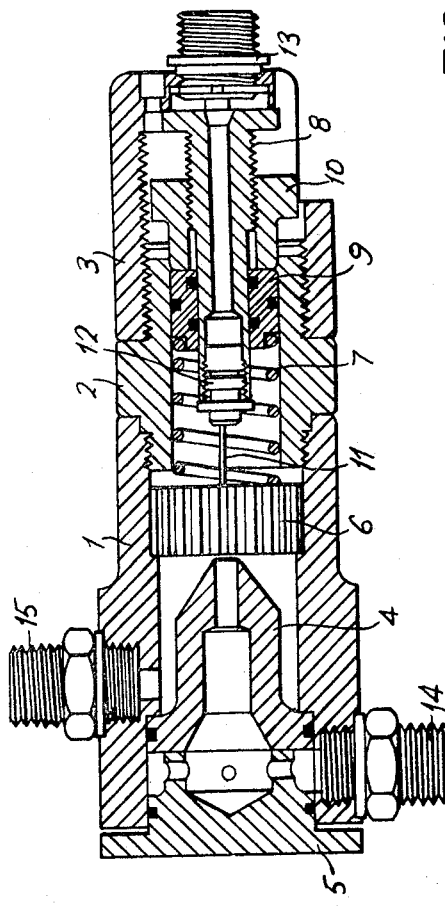

One arrangement in accordance with the invention will now be described by way of example with reference to the accompanying drawings, in which:

FIG. 1 is a sectional view of a flow meter suitable for measuring the flow of liquids such as oils; and FIGS. 2a and 2b are enlarged views of a component of the flow meter shown in FIG. 1.

Referring to FIG. 1, the flow meter comprises a cylinder 1 part of which has an internal diameter of 4.4 cm and part of which has an internal diameter of 3.8 cm. The end of the part of larger diameter is sealed to a sleeve 2 on to which is screwed a cap 3 which is partly cut away. Within the part of the cylinder 1 of smaller internal diameter is disposed a sharp edged nozzle 4 which is held in place by a cover 5, the free end of the nozzle 4 being very slightly recessed with respect to the step between the two parts of the cylinder 1. Within the part of the cylinder 1 of larger internal diameter is disposed a piston 6 of the same diameter, which is urged towards the nozzle 4 by a helical spring 7 the major part of which is located within the sleeve 2; the piston 6 is prevented from coming directly into contact with the nozzle 4 by the stop constituted by the step between the two parts of the cylinder 1, so as to prevent damage to the edge of the nozzle 4.

Secured to the cap 3 is a tubular member 8 disposed co-axially within the sleeve 2 and cap 3, and a collar 9 is disposed within the sleeve 2 and around the member 8 so as to bear on the end of the spring 7 remote from the piston 6, the collar 9 being sealed to the sleeve 2 and member 8 and being axially movable, under the influence of a nut 10 screwing on to the member 8, so as to adjust the loading of the spring 7.

The piston 6 is secured to the actuating rod 11 of the displacement transducer 12 disposed within the member 8, the transducer 12 being of the differential inductance type and being connectable to an external circuit via a connector 13.

Referring now also to FIGS. 2a and 2b, which are respectively an end view and a sectional side view of the piston 6, the face of the piston 6 remote from the rod 11 has formed in it an annular groove 6A, leaving a central boss of diameter 1.6 cm whose end surface 6B is disposed close to and facing the nozzle 4. In order to allow leakage of liquid past the piston 6, 24 longitudinal semi-cylindrical grooves 6C of diameter 1.6 mm are formed in the circumferential surface of the piston 6; further leakage paths are also provided in the form of two holes 6D of diameter 3.2 mm which extend from the base of the groove 6A to the base of a second annular groove 6E formed in the face of the piston 6 nearer the rod 11.

In use of the flow meter a flow of liquid to be monitored is fed to the nozzle 4 via an inlet connection 14 and apertures in the cover 5, so as to impinge upon the surface 6B, the liquid flowing out of the cylinder 1 via an outlet connection 15. The balance of the forces exerted on the piston 6 by the jet of liquid emerging from the nozzle 4 and by the spring 7 is such that the displacement of the surface 6B from the edge of the nozzle 4 is dependent upon the rate of flow of the liquid, this displacement being sensed by the transducer 12 and monitored by means of the external circuit, which may be of any suitable conventional form. It can be shown theoretically that, provided that the displacement of the surface 6B from the edge of the nozzle 4 is small in relation to the diameter of the orifice of the nozzle 4, the volume rate of flow Q of the liquid for steady state flow is given by the equation:

$$Q = 2CX \sqrt{2\pi(KX+P)/(1+Y^2)\rho}$$

where $Y = 2CX/R$, X is the displacement of the surface 6B from the edge of the nozzle 4, R is the radius of the orifice of the nozzle 4, $\rho$ is the density of the liquid, K is the stiffness of the spring 7, P is the loading of the spring 7 and C is the discharge coefficient of the nozzle 4. For values of Y much less than one, Q is approximately linearly proportional to X in accordance with the equation:

$$Q = 2CX \sqrt{2\pi P/\rho}.$$

Suitable practical values for the relevant parameters are as follows:

R = 2.5 mm
K = 1.6 kgf/cm
P = 0.9 – 1.8 kgf.

An arrangement utilizing such values has been found in practice to conform closely in performance to the theoretical prediction in respect of steady state flow for values of X up to about 0.75 mm. It will be appreciated that the corresponding range of rates of flow will depend on the liquid whose flow is being monitored and the adjustment of the loading of the spring 7. For an oil having a specific gravity of 0.85 and for which the discharge coefficient C has a value of 0.65, a displacement of 0.1 mm corresponds to a flow rate of 47 cm³/s with the spring loading set at the maximum of the range indicated above.

It will be appreciated that the motion of the piston 6 is subject to appreciable viscous damping by the liquid in the cylinder 1, and this ensures stable performance at the higher end of the measurable range of rates of flow. The degree of damping is important in relation to the transient response characteristics of the flow meter. The transient response can be analyzed by considering the effect of a perturbation $q$ in the flow rate, starting from a steady state flow rate $Q_R$. It can be shown that the equation of motion of the piston 6 under these circumstances is $$M(d^2x/dt^2) + V(dx/dt) + (K+H)x = Aq$$

where $x$ is the incremental displacement of the piston 6, $t$ is time, M is the mass of the piston 6, V is a term representing the viscous friction acting on the piston 6, H (which may be termed the hydraulic stiffness) is equal to $\rho Q_R^2/4\pi C^2 X_R^3$, and A is equal to $\rho Q_R (1 + Y_R^2)/\pi R^2 Y_R^2$, $X_R$ and $Y_R$ being the values of X and Y corresponding to $Q_R$. This equation may be written in the more conventional form $$(d^2x/dt^2) + 2Z\omega (dx/dt) + \omega^2 x = B\omega^2 9,$$

where Z, the damping ratio, is equal to:

$$V/2 \sqrt{M(K+H)},$$

$\omega$, the undamped natural frequency, is equal to:

$$\sqrt{(K+H)/M}$$

and B is equal to $A/(K+H)$. For small values of $X_R$, B is substantially independent of $Q_R$ but both Z and $\omega$ vary with $Q_R$ since H is approximately inversely proportional to $Q_R$.

In order to obtain satisfactory transient response characteristics, the undamped natural frequency $\omega$ should be relatively high and the damping ratio Z should be less than unity (i.e. the damping should be less than critical) but should not be less than about 0.3 in order to avoid excessive overshoot in response to an abrupt change in the flow rate. Taking the mass M as 45 gm and the reference flow rate $Q_R$ as 82 cm³/s, and the values of the other relevant parameters as indicated above, the undamped natural frequency has a value of 340 Hz. The form of the piston 6 shown in FIGS. 2a and 2b gives a value for V such that the damping ratio Z has a value of about 0.5 at the same reference flow rate for a liquid of viscosity 100 centistokes. It will thus be appreciated that the flow meter described above performs very satisfactorily in respect of its transient response characteristics over the measurable range of flow rates.

We claim:

1. A flow meter comprising a cylindrical chamber having a nozzle through which a flow of liquid may be introduced longitudinally into the chamber and an outlet for egress of the liquid from the chamber, a leaky piston arranged to slide longitudinally within the chamber and having a surface disposed close to and facing the nozzle, resilient means arranged to urge the piston towards the nozzle, and a displacement transducer responsive to the displacement of said surface from the nozzle, the mass M and leakage passages of said leaky piston are coordinated with the typical flow rate Q and viscosity of the fluid whose flow is measured by said flow meter at a given displacement X of the piston so that the viscous friction V acting upon said piston causes the damping ratio Z acting upon said piston to be less than unity where $$Z = (V/2) \sqrt{M(K + [\zeta Q^2/4\pi C^2 X^3])},$$

K is the spring constant and $\zeta$ and C are constants depending upon the fluid measured whereby satisfactory responses are achieved to transient changes in flow rate Q.

2. A flow meter according to claim 1, further comprising means for adjusting the loading of the resilient means.

* * * * *